(12) United States Patent
Vallone et al.

(10) Patent No.: US 8,553,084 B2
(45) Date of Patent: Oct. 8, 2013

(54) SPECIFYING SEARCH CRITERIA FOR SEARCHING VIDEO DATA

(75) Inventors: Robert P. Vallone, Palo Alto, CA (US); Michael E. Wells, San Francisco, CA (US); Shannon P. Hale, San Francisco, CA (US); Stephen D. Fleischer, San Francisco, CA (US); Colvin H. Pitts, Mountain View, CA (US); Gordon T. Haupt, San Francisco, CA (US)

(73) Assignee: 3VR Security, Inc., San Francisco, CA (US)

( * ) Notice: Subject to any disclaimer, the term of this patent is extended or adjusted under 35 U.S.C. 154(b) by 1808 days.

(21) Appl. No.: 11/520,116

(22) Filed: Sep. 12, 2006

(65) Prior Publication Data

US 2007/0061696 A1  Mar. 15, 2007

Related U.S. Application Data

(60) Provisional application No. 60/716,729, filed on Sep. 12, 2005.

(51) Int. Cl.
*H04N 7/18* (2006.01)
*H04N 5/14* (2006.01)

(52) U.S. Cl.
USPC ........... 348/143; 348/152; 348/154; 348/155; 348/699

(58) Field of Classification Search
USPC .......................... 348/143, 152, 154, 155, 699
See application file for complete search history.

(56) References Cited

U.S. PATENT DOCUMENTS

| 5,802,361 | A   | * | 9/1998  | Wang et al. ........... 382/217 |
| 5,969,755 | A   |   | 10/1999 | Courtney                       |
| 6,182,069 | B1  | * | 1/2001  | Niblack et al. ............ 1/1 |
| 6,516,090 | B1  | * | 2/2003  | Lennon et al. ......... 382/173 |
| 6,553,150 | B1  | * | 4/2003  | Wee et al. ............. 382/243 |
| 7,577,199 | B1  |   | 8/2009  | Herz                           |
| 2006/0227997 | A1 | * | 10/2006 | Au et al. .............. 382/103 |

FOREIGN PATENT DOCUMENTS

WO    WO 03/079663 A2    9/2003

OTHER PUBLICATIONS

PCT International Search Report and Written Opinion, PCT/US2006/035960, dated May 9, 2007, 15 pages.
A. Perrott et al., "Real-time multimedia tagging and content-based retrieval for CCTV surveillance systems", Proceedings of SPIE vol. 4862, 2002, pp. 40-49, XP002430879.

(Continued)

*Primary Examiner* — Chikaodili E Anyikire
(74) *Attorney, Agent, or Firm* — Hickman Palermo Truong Becker Bingham Wong LLP; Daniel D. Ledesma

(57) ABSTRACT

A method and apparatus is described for specifying regions of interest within a two-dimensional view of visual information that comprises a series of frames. Visual changes that occur in the view are stored. A user enters search criteria that specify at least one first region of interest within the view and a visual change. A visual change may include a change in pixel values or a detection of motion of one or more objects within the view. The first search criteria are compared against the stored visual changes to identify a sequence of frames in which the specified visual change occurred within the first region of interest. The search criteria may specify multiple regions of interest, each with one or more types of visual changes. If a motion is specified, then a direction, speed, and behavior of a moving object may also be specified.

36 Claims, 11 Drawing Sheets

(56) References Cited

OTHER PUBLICATIONS

"Text of ISO/IEC 15938-3/FCD Information Technology—Multimedia Content Description Interface—Part 3 Visual" ISO/IEC JTC1/SC29/WG11/N4062, Mar. 2001, pp. 1-93, XP001001412.

"MPEG-7 Visual part of eXperimentation Model Version 11.0", ISO/IEC JTC1/SC29/WG11/N4362, Jul. 2001, pp. 1-91, XP007902141.

S. Jeannin et al., "Motion descriptors for content-based video representation", Signal Processing, Image Communication, Elsevier Science Publishers, Amsterdam, NL, vol. 16, No. 1-2, Sep. 2000, pp. 59-85, XP004216268.

J. Fan et al., "Class View: Hierarchical Video Shot Classification, Indexing, and Accessing", IEEE Transactions on Multimedia, IEEE Service Center, Piscataway, NJ, US, vol. 6, No. 1, Feb. 2004, pp. 70-86, XP002347542.

\* cited by examiner

SPECIFYING SEARCH CRITERIA FOR SEARCHING VIDEO DATA

CLAIM OF PRIORITY

This application claims priority to U.S. Provisional Patent Application Ser. No. 60/716,729 filed Sep. 12, 2005, the entire contents of which is incorporated herein by this reference is.

FIELD OF THE INVENTION

The present invention relates to specifying patterns of motion for real-time alerting and/or forensic searching of motion analysis of video data.

BACKGROUND

Analyzing video streams to determine whether or not any interesting activities or objects are present is a resource-intensive operation. Software applications are used to analyze video data, attempting to recognize certain activities or objects in the video data. For example, recognition applications exist for recognizing faces, gestures, vehicles, guns, motion, and the like. Often, such applications are used to analyze surveillance video streams for security purposes.

One purpose for storing video data is to search many hours or days of video data for suspicious persons and activities, and particular events. For example, security personnel for a hotel may be told that a valuable necklace of a hotel guest was stolen during the evening hours of a certain day.

One approach to discover the identity of the thief would be for the security personnel to manually review all the video data that was captured during the appropriate hours and search for suspicious behavior or a particular person within the video data. This may require many hours of labor.

Another approach is to specify a query to execute directly against the video data or against analysis data that has been generated based on the actual video data. The query may specify that motion must have been detected by one or more video cameras during a particular period of time. Alternatively, the query may specify an object (e.g., a particular person, the shape of a necklace, etc.) to search for within the video data or analysis data.

What is needed is a technique for specifying more complex criteria to search for particular changes captured within video data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
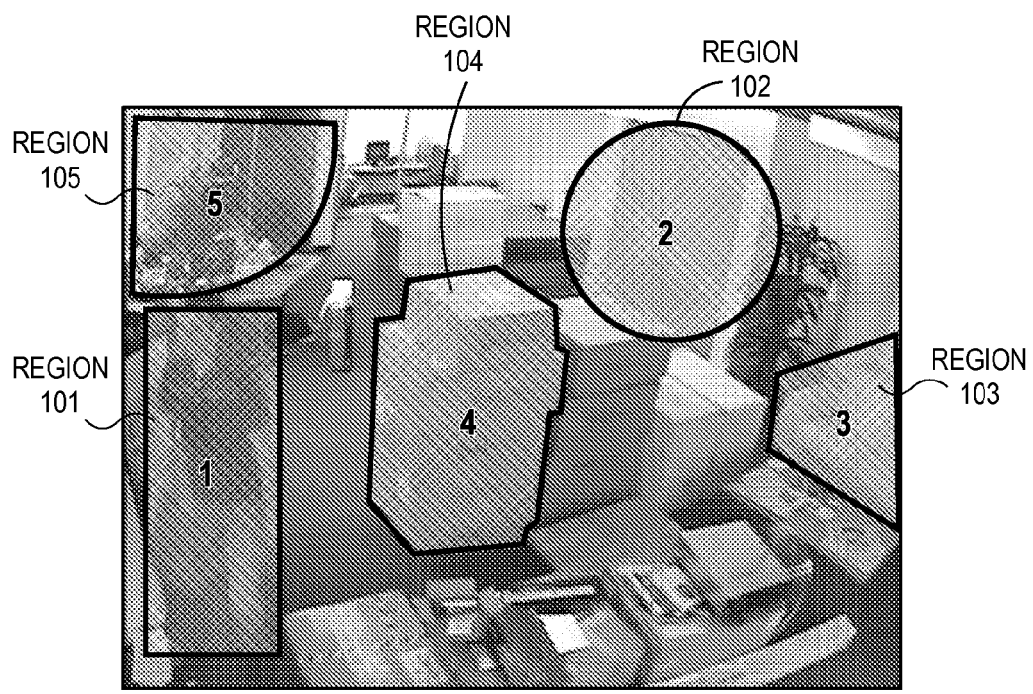
FIGS. 1A-B are screenshots illustrating that specified regions of interest may be of any arbitrary shape and size, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A user interface is described for allowing a user to specify various types of search criteria to search through visual media. In one embodiment, the user interface allows users to specify "regions of interest" and/or "visual changes of interest". "Regions of interest" are relative to a view (e.g., of a camera), and may be of any size and shape. For example, a user may select a region of interest that corresponds to a square in the top left corner of a camera's view.

A "visual change of interest" may be, for example, a particular type of motion. Types of motion that may be specified as visual changes of interest include the behavior, shape, direction, and speed of the motion. Furthermore, any type of visual change may be specified—not just motion. For instance, a user may specify, as a visual change of interest, a change in light intensity.

In one embodiment, the search criteria may include any number of visual changes of interest for each of the specified regions of interest. Conversely, the search criteria may include any number of regions of interest for each of the specified visual changes. Once specified, the search criteria are compared against video data to identify matches. In some implementations, detection of a match may cause an action to be automatically performed, such as the generation of an alert or an event.

The embodiments of the invention described herein are illustrated in the context of video surveillance systems. However, embodiments of the invention are not limited to that context. Embodiments of the invention are also relevant in other non-surveillance contexts, such as specifying search criteria to search through a series of computer-generated frames.

Storage of Visual Changes

Any technique for storing information about visual changes that occur in a two-dimensional view of visual information may be used. Embodiments of the invention are not limited to any particular visual information storage technique.

According to one embodiment, the technique used for storing information about visual changes is described in U.S. patent application Ser. No. 11/520,532, entitled "STORAGE OF VIDEO ANALYSIS DATA FOR REAL-TIME ALERTING AND FORENSIC ANALYSIS", filed Sep. 12, 2006, the contents of which are hereby incorporated by reference in their entirety for all purposes.

Video Data Change Records

The patent application referenced above describes video data change records and change information. A "video data change record" (VDCR) is a logical composition of one or more fields, items, attributes, and/or objects. A VDCR corresponds to a plurality of frames and includes change information (described below). A VDCR may correspond to a single event or to multiple events. For example, a VDCR may correspond to a certain time period (e.g. a week) during which many events occurred. Additional information of a VDCR may include, but is not limited to, (a) a start time of when the first frame in the plurality of frames was captured, (b) an end time of when the last frame in the plurality of frames was captured, (c) a time duration indicating the difference between the start time and the end time, (d) type data indicating whether the change corresponds to a detection of motion or only a pixel change, (e) shape data indicating a shape (e.g., person, car) of a moving object that triggered the VDCR, (f) behavior data indicating a behavior (e.g., walking, running, driving) of a moving object that triggered the VDCR, and (g) an indication of whether the VDCR corresponds to an event or a specified time interval.

A VDCR may also contain a reference to the actual video data that corresponds to the plurality of frames of the VDCR in order to enable a user of the storage system to view the corresponding video data. If a VDCR contains a start time, then the start time may be used as the reference.

Change Information

"Change information" is information that indicates visual changes that are detected relative to a plurality of frames. The change information may be maintained in, and the plurality of frames may correspond to, a particular VDCR. Change information may indicate motion that is detected in the plurality of frames and/or a change in pixel values that is detected in the plurality of frames, such as brightness and hue. For example, a pixel change may result from the shadow, of a person, that enters and leaves a view represented by the frames. A pixel change may also result from a light bulb turning on or off that affects the brightness of objects in the frames. In some instances, the last frame in an event may appear as an exact duplicate of the first frame of the event. For example, suppose a light bulb faded out and then back on. By simply differencing the pixel values of the first frame with the pixel values of the last frame, the difference may be zero. Thus, the change information may indicate the greatest amount of change. For example, if the light bulb mentioned above went out and then back on and the possible pixel values range from 0-100, the change information may indicate 100 instead of zero.

Correspondingly, if the change information indicates a motion, then the change information may further indicate all directions and/or speeds of the motion. For example, with a particular view, an object may move right, left, up, and down. Thus, the change information may indicate all directions. As another example, if the object moved at five different speeds in a certain direction, then change information may indicate the largest speed.

Any method for detecting and calculating visual changes (whether just pixel change or motion) may be used. Thus, embodiments of the invention are not limited to any particular method.

Change information may further include information on a per-region basis. A "region" is a portion of a two-dimensional view (e.g., captured by a video camera) of the video data. The view may be divided into multiple uniform regions, such as in a grid layout. However, a region may be of any arbitrary size and shape. Thus, change information may include motion and/or pixel change information for each specified region of the view for the duration of the plurality of frames that corresponds to the change information.

An "event" is generally associated with a visual change detected in video data. For example, an event may correspond to the detection of a person walking in a region of the view. The duration of the event is typically the length of time that the visual change occurs. After a certain amount of time has elapsed during which no more visual change is detected, then the event is considered to have ended.

An event may be initiated, not only on the detection of visual changes within a view, but also upon the occurrence of an external event. For example, an event may be triggered by a fire alarm, where no visual indication of the fire alarm is evident in the video data. Once the fire alarm is detected, the frames of video data from that point on are used to generate a VDCR that represents the event. The event may end, for example, when the fire alarm ends or when an administrator of a video surveillance system indicates that the event is completed.

Alternatively, a VDCR may correspond to a specified time interval instead of to an event. For example, regardless of whether a visual change is detected, a VDCR may be generated for each 5-minute interval after every hour. As another example, a VDCR may be generated for each 24 hour period.

A VDCR may be generated from other VDCRs and not necessarily from the video data itself. For example, if a VDCR is generated for each one-hour period of each day, then a "day" VDCR may be generated directly from the twenty-four "hour" VDCRs that correspond to that day. Similarly, a "week" VDCR may be generated from seven "day" VDCRs, and so forth.

Specifying Complex Search Criteria

A user may specify one or more regions of interest of a two-dimensional view of video data. The ability to specify regions may be done in the context of specifying criteria for (1) real-time alerting, (2) forensic searching, and/or (3) triggering the generation of events (e.g., VDCRs).

As an example of real-time alerting, a user may specify a region of interest and a certain type of motion that must occur in the region before an alert is generated. Thus, the motion that triggers the alert occurs after the motion criteria have been specified. Once a motion is detected in the region and otherwise satisfies the specified criteria, an alert is generated even though a VDCR for the event may not have yet been generated.

As an example of forensic searching, a user may specify a region of interest and a certain type of motion that must have occurred in the region. Thus, the search criteria are compared against VDCRs that have already been generated and stored.

In the following embodiments, however, the specified regions are described in the context of what combination of motions may trigger the generation of events.

Regions of Interest

Figure 1B:

FIGS. 1A-B are screenshots illustrating that specified regions of interest may be of any arbitrary shape and size, according to an embodiment of the invention. In FIG. 1A, region 101 is a rectangle, region 102 is a circle/ellipse, region 103 is a convex polygon, region 104 is a non-convex polygon, and region 105 is an arbitrary shape combining straight and curved lines.

FIG. 1B illustrates that an arbitrary line may be used to divide a view. In this example, the area of the view to the left of line 110 is specified as the region of interest.

Entire Region V. any Portion of a Region

Figure 2A:
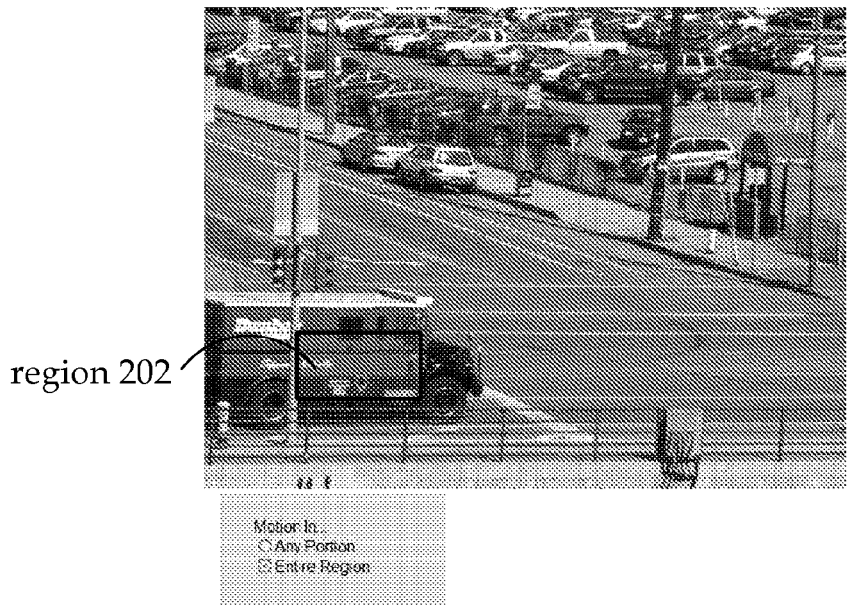
FIGS. 2A-B are screenshots illustrating that motion may be specified as occurring within the entirety of a specified region, according to an embodiment of the invention.
Figure 2B:
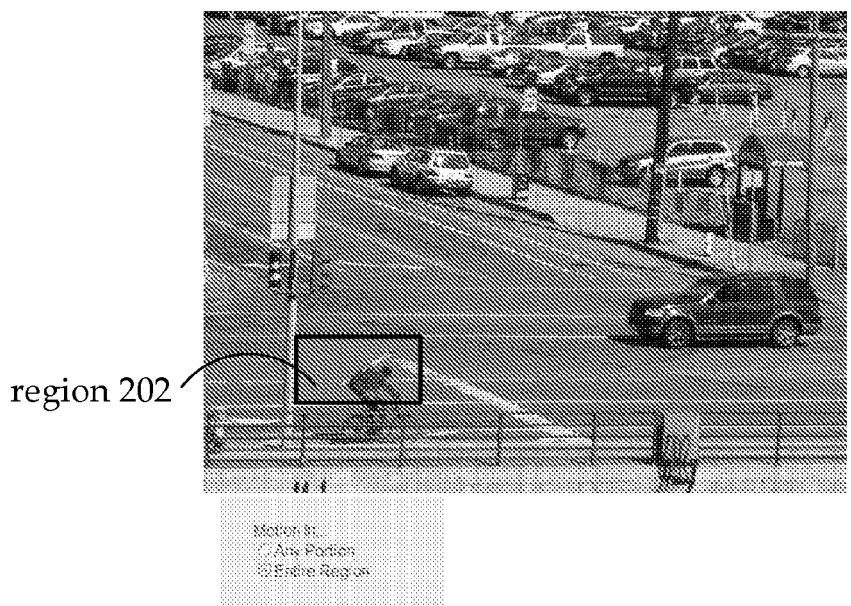

FIGS. 2A-B are screenshots illustrating that motion may be specified as occurring within the entirety of a specified region 202, according to an embodiment of the invention. In FIGS. 2A-B, the option "Entire Region" is selected indicating that motion must be detected in the entirety of region 202 to initiate the generation of an event, satisfy search criteria, or trigger an alarm. Both generating events and triggering alarms are referred to hereinafter as "triggering an action". In FIG. 2A, the movement of the red truck through the entirety of region 202 triggers an alert.

In FIG. 2B, on the other hand, the bicycle does not trigger an alert since the bicycle and its rider do not move through the entirety of region 202. In one embodiment, the interface provides an option that indicates (a) that the object moving through the region occupies the entire region in a single frame and/or (b) only that the object moves through the entire region without occupying the entire region in a single frame.

Figure 2C:
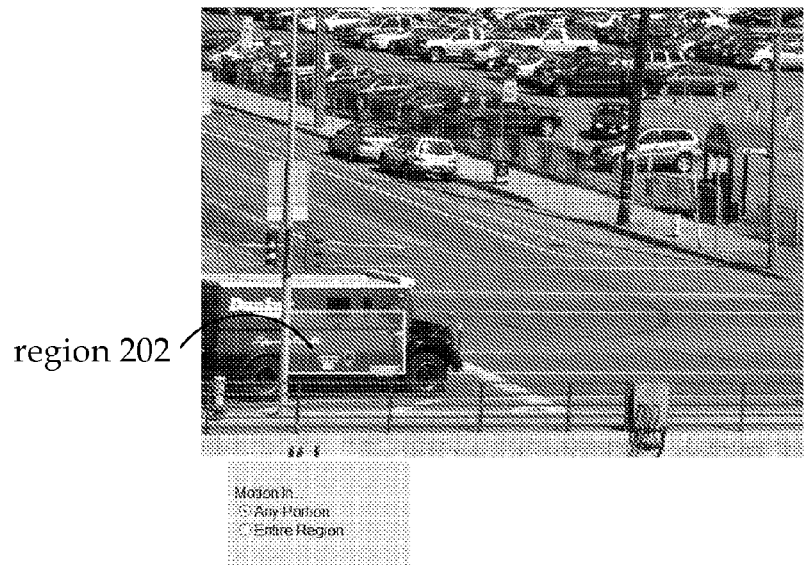
FIGS. 2C-D are screenshots illustrating that motion may be specified as occurring within any portion of a specified region, according to an embodiment of the invention.
Figure 2D:
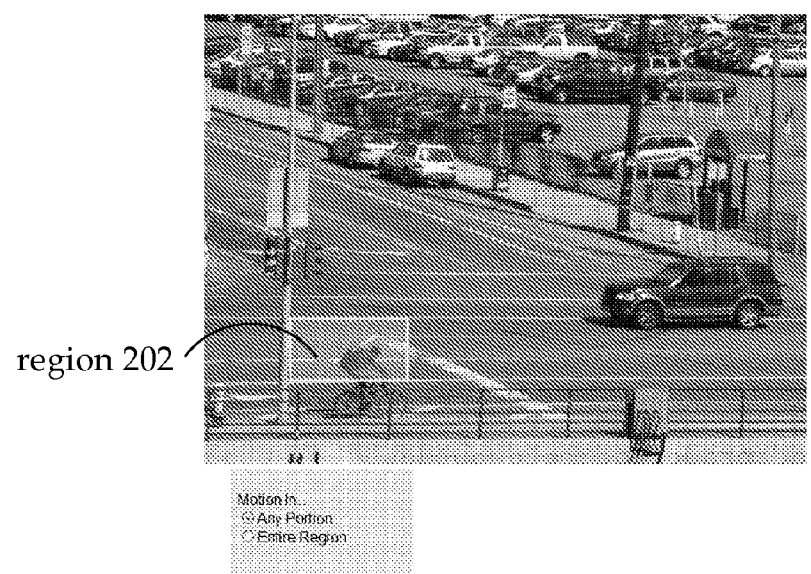

FIGS. 2C-D are screenshots illustrating that motion may be specified as occurring within any portion of the specified region 202, according to an embodiment of the invention. In FIGS. 2C-D, the option "Any Portion" is selected indicating that any motion in any portion of region 202 will trigger an action. Because both the red truck in FIG. 2C and the bicycle rider in FIG. 2D occupy at least a portion of region 202, an event is generated for each motion detected in FIGS. 2C-D.

Boolean Logic

Figure 3A:
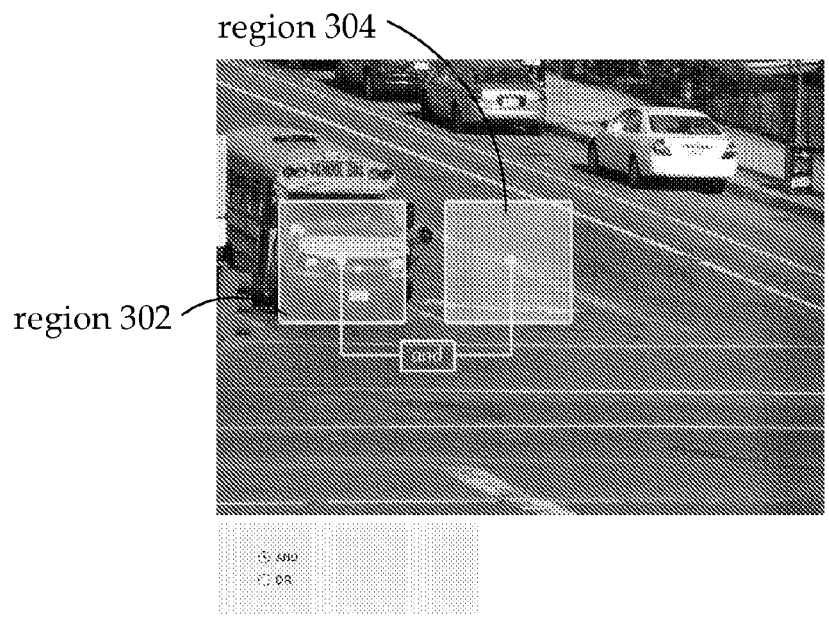
FIGS. 3A-B are screenshots illustrating that Boolean logic may be used when specifying multiple regions, according to an embodiment of the invention.
Figure 3B:
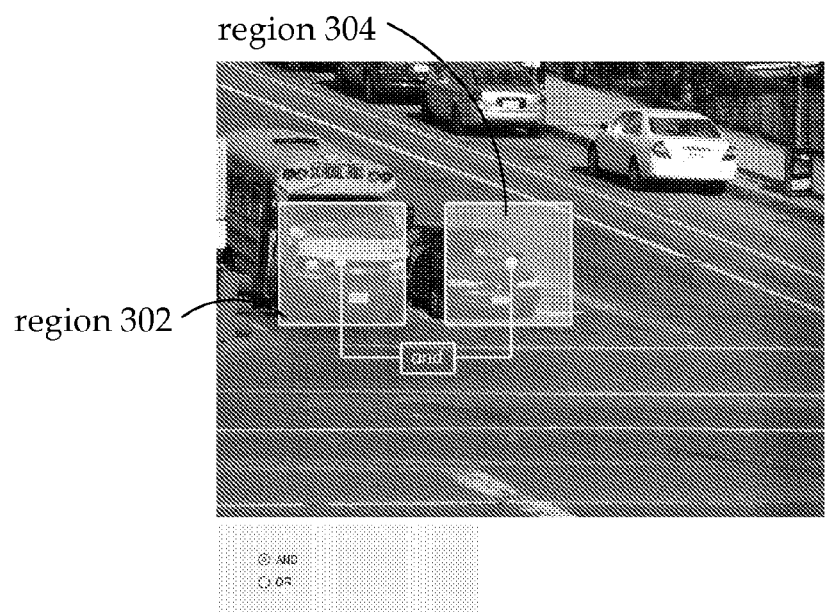

FIGS. 3A-B are screenshots illustrating that Boolean logic may be used when specifying multiple regions, according to an embodiment of the invention. In FIGS. 3A-B, the Boolean "And" is selected indicating that motion must be detected in both regions 302 and 304 to trigger an action. In FIG. 3A, the movement of the bus through (e.g., any portion of) region 302 alone does not trigger the generation of an event. In FIG. 3B, however, the movement of the bus through region 302 and the movement of the car through region 304 will trigger an action.

Figure 4:
FIG. 4 is a screenshot illustrating that two specified regions may overlap, according to an embodiment of the invention.

FIG. 4 is a screenshot illustrating that two specified regions may overlap, according to an embodiment of the invention. In FIG. 4, the options "Any Portion" and "AND" are selected indicating that motion must be detected in any portion of region 402 and any portion of region 404 to trigger an action. Both specified regions overlap at area 410. In this example, such event generation specifications may help detect when a car is making a left turn while a person is in the crosswalk.

Velocity

Figure 5A:
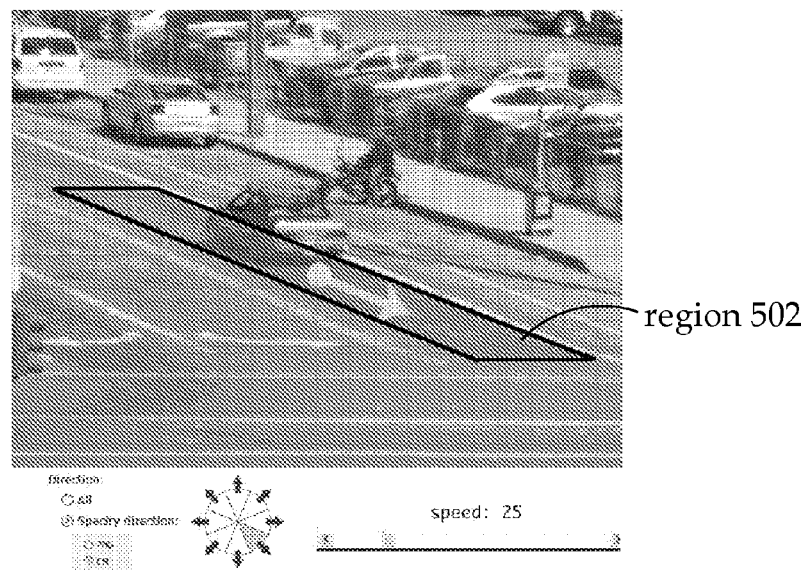
FIGS. 5A-D are screenshots illustrating that one or more velocities of a motion may be specified for a particular region, according to an embodiment of the invention.
Figure 5B:
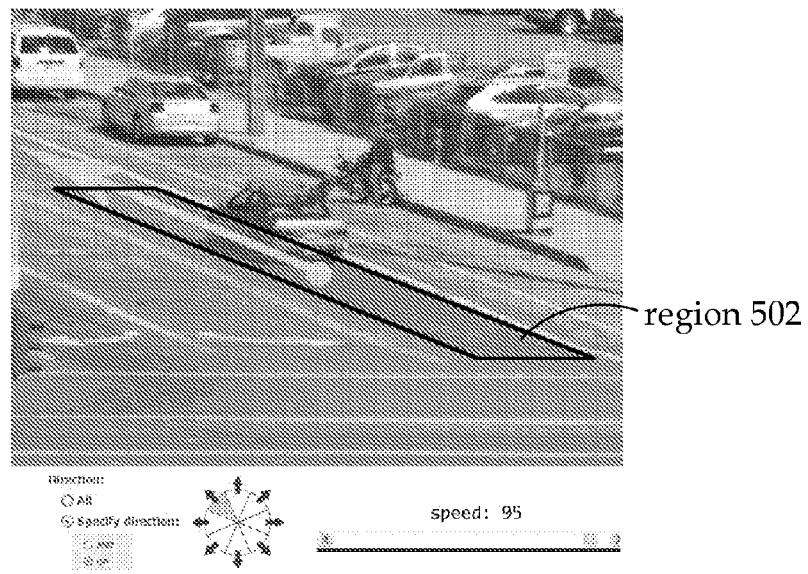

FIGS. 5A-D are screenshots illustrating that one or more velocities of a motion may be specified for a particular region, according to an embodiment of the invention. FIGS. 5A-B each indicates one direction and one speed for a region 502. In FIG. 5A, the specified motion is directed, with respect to the view, down and to the right. The associated speed is 25 units indicating, for example, 25 mph or 25 kph. Because region 502 is on the right-hand side of the road, the above motion specifications (i.e., direction and speed) are used to determine whether a car traveling in the wrong direction is moving at or above a certain speed.

In FIG. 5B, the specified motion is directed, with respect to the view, up and to the left. The associated speed is 95 (e.g., mph). Such motion specifications may be used to record and identify a speeding car.

Figure 5C:
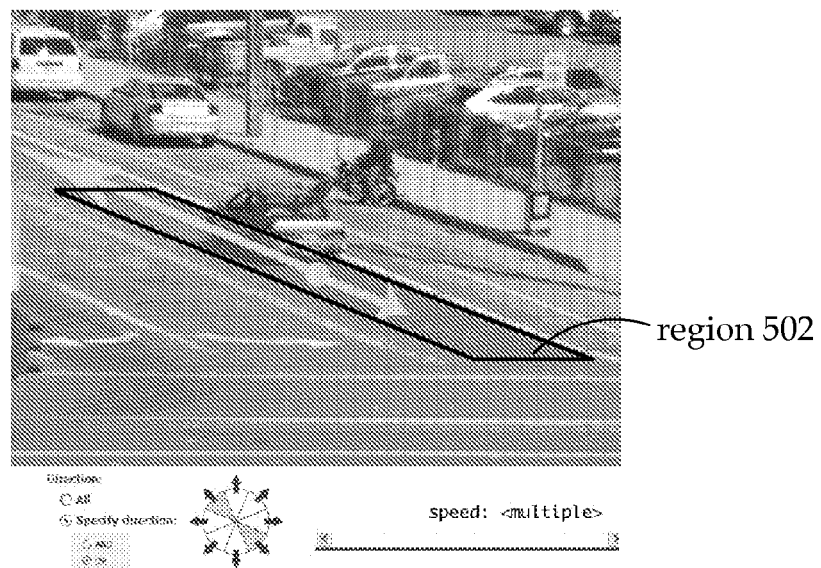
Figure 5D:
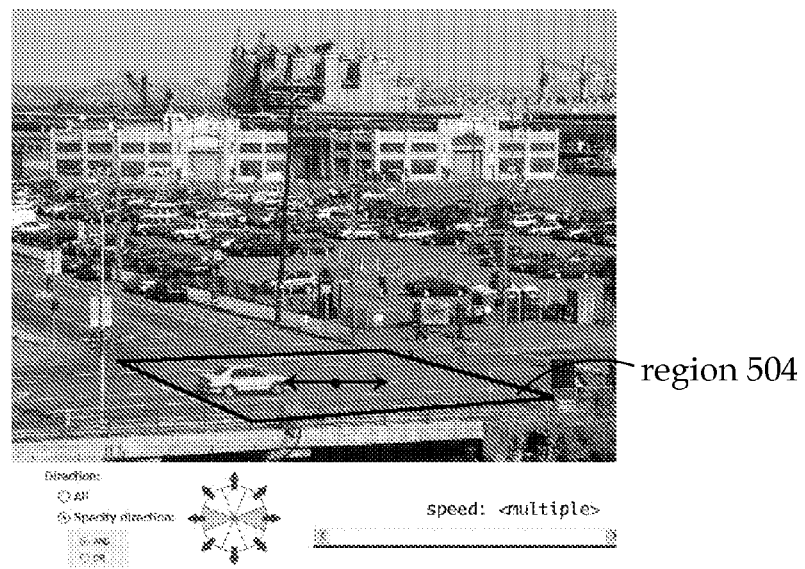

FIGS. 5C-D each indicates multiple directions and speeds for each specified region. In FIG. 5C, the specified directions for region 502 are, with respect to the view, down and to the right and up and to the left. Also, a speed may be associated with each direction. The Boolean logic option "OR" is selected indicating that either motion will trigger an action. Such specifications may be used to detect speeding cars and cars traveling in the wrong direction.

In FIG. 5D, the specified directions for a region 504 are, with respect to the view, to the left and to the right. As above, a speed may be associated with each direction. The Boolean logic option "AND" is selected indicating that motion in both directions will trigger an action. Such specified directions for a single region may be used to detect a car making an illegal U-turn.

Behavior and Shape of Moving Object

Figure 6:
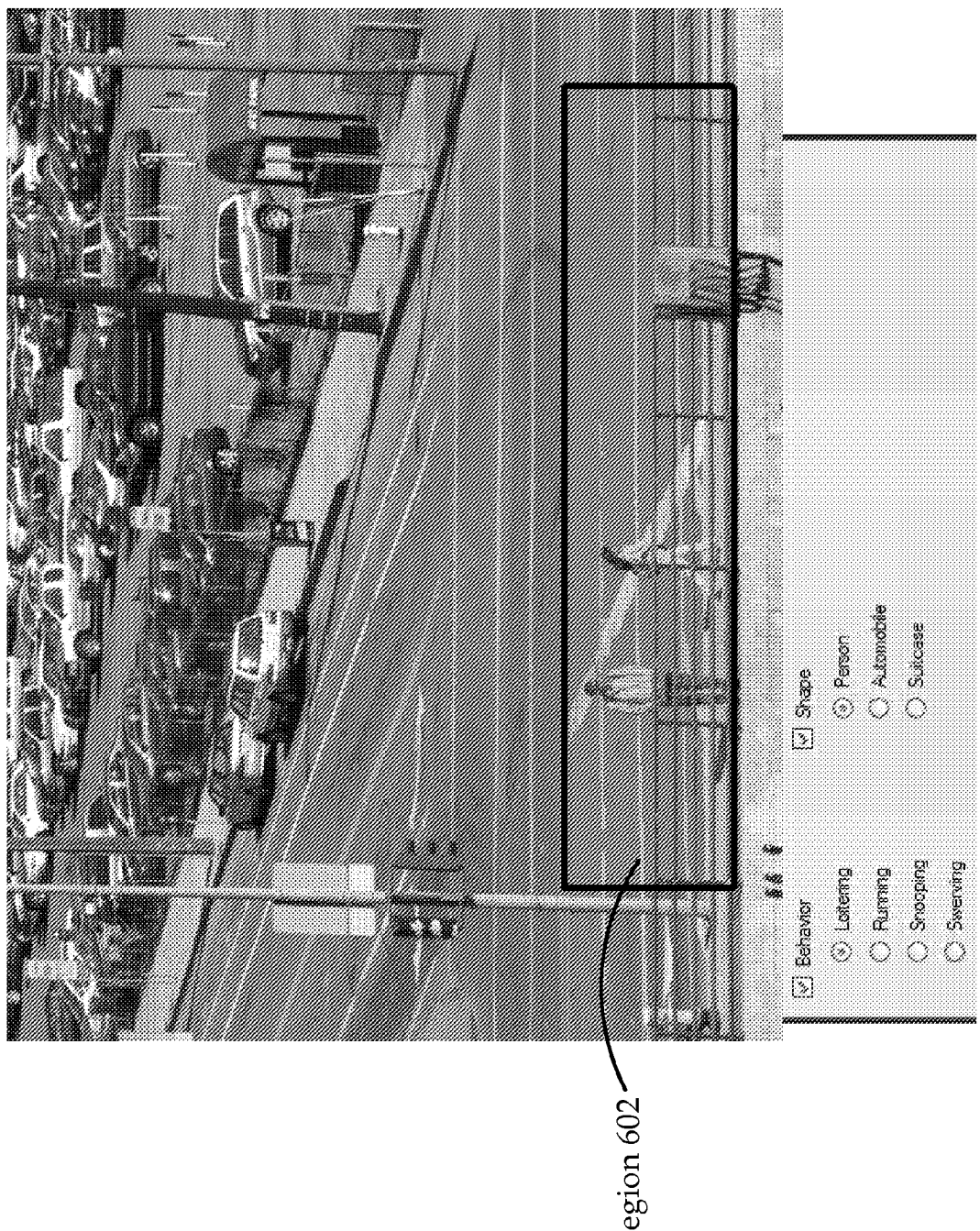
FIG. 6 is a screenshot illustrating that a type of motion behavior may be specified for a particular region, according to an embodiment of the invention.

FIG. 6 is a screenshot illustrating that a type of motion behavior may be specified for a particular region 602, according to an embodiment of the invention. FIG. 6 illustrates two checkboxes ("Behavior" and "Shape") and associated radio buttons. The type of "Shape" selected may determine the behaviors listed under the "Behavior" selection. In this example, the shape "Person" is selected. Other shapes that may be selected include automobiles and suitcases. In this example, the behavior "Loitering" is also selected. Other behaviors that may be selected for a "Person" shape may include running, snooping, and swerving, as illustrated. Thus, a behavior of a motion refers to one or more characteristics of the motion. For example, a running behavior may be characterized by a person moving above a particular speed. As another example, a snooping behavior may be characterized by a person remaining in that particular area for a certain amount of time.

According to this example, any person that is "loitering" in region 602 will trigger an action. The interface may include additional controls for specifying what constitutes loitering, such as the length of time and the amount of movement within that time.

Light Intensity

Figure 7A:
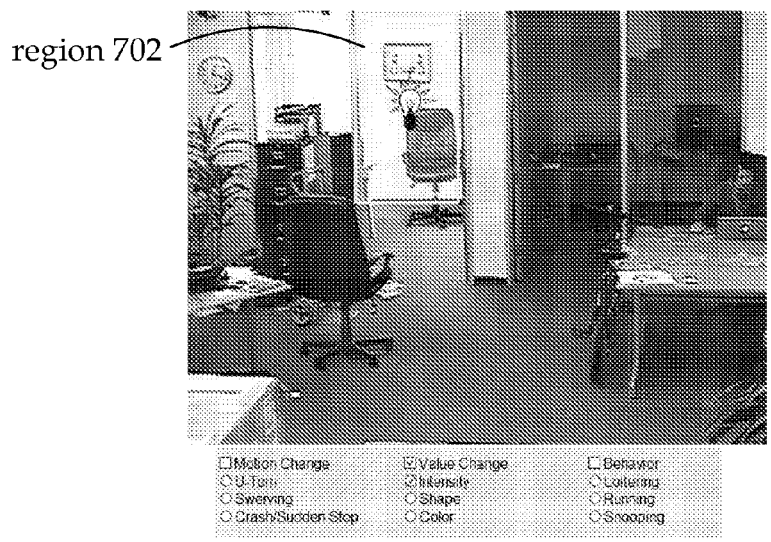
FIGS. 7A-C are screenshots illustrating that change in light intensity may be specified as a visual change, according to an embodiment of the invention.
Figure 7B:
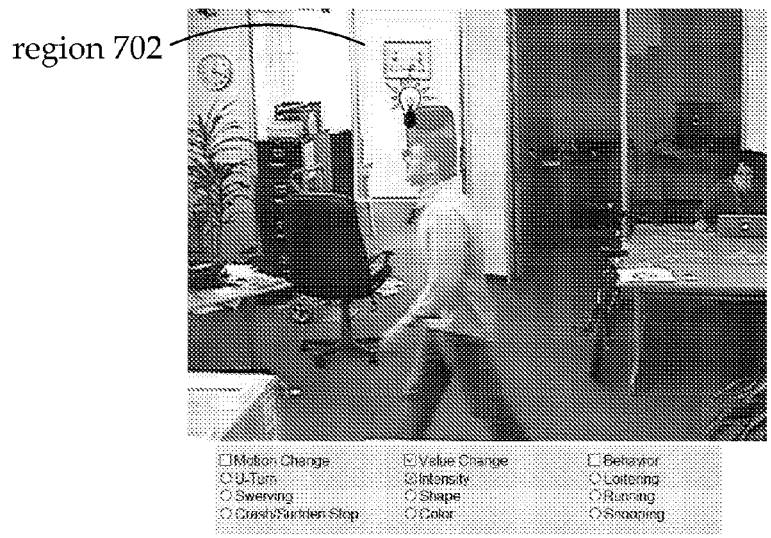
Figure 7C:
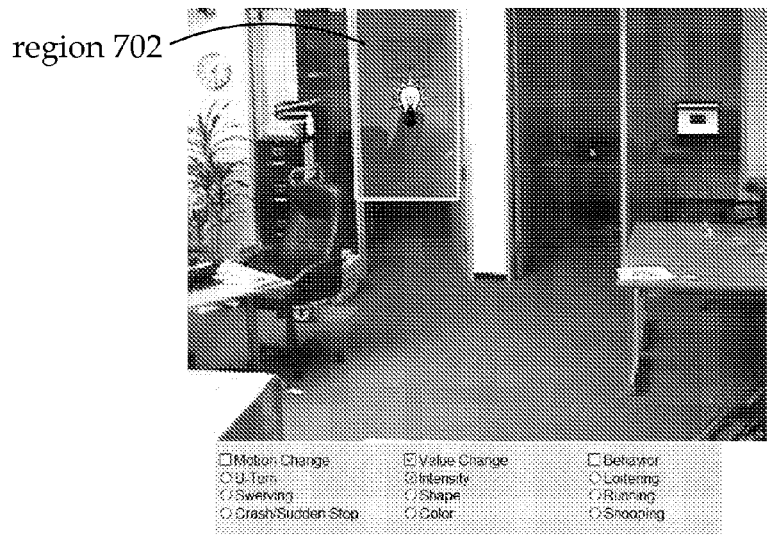

FIGS. 7A-C are screenshots illustrating that change in light intensity may be specified as a visual change, according to an embodiment of the invention. FIGS. 7A-C each illustrates three checkboxes—"Motion Change," "Value Change," and "Behavior." Only the "Value Change" checkbox is selected, with the "Intensity" radio button also selected, indicating that a change in intensity of the light (as opposed to a detection of motion) in a region 702 will trigger an action. The light icon in region 702 may be used to visually distinguish the specified region from other regions where motion triggers an event. The interface may include additional controls for specifying how much intensity change is required to trigger an action.

FIG. 7A illustrates the initial point in time when region 702 is specified. FIG. 7B illustrates that, because "Value Change" and "Intensity" are selected, a person moving through region 702 will not trigger an action. FIG. 7C illustrates the view with a light turn off that affects the light intensity in region 702. Thus, an event may be triggered depending on the amount of intensity change required to do so.

Vehicle Motion

Figure 8:
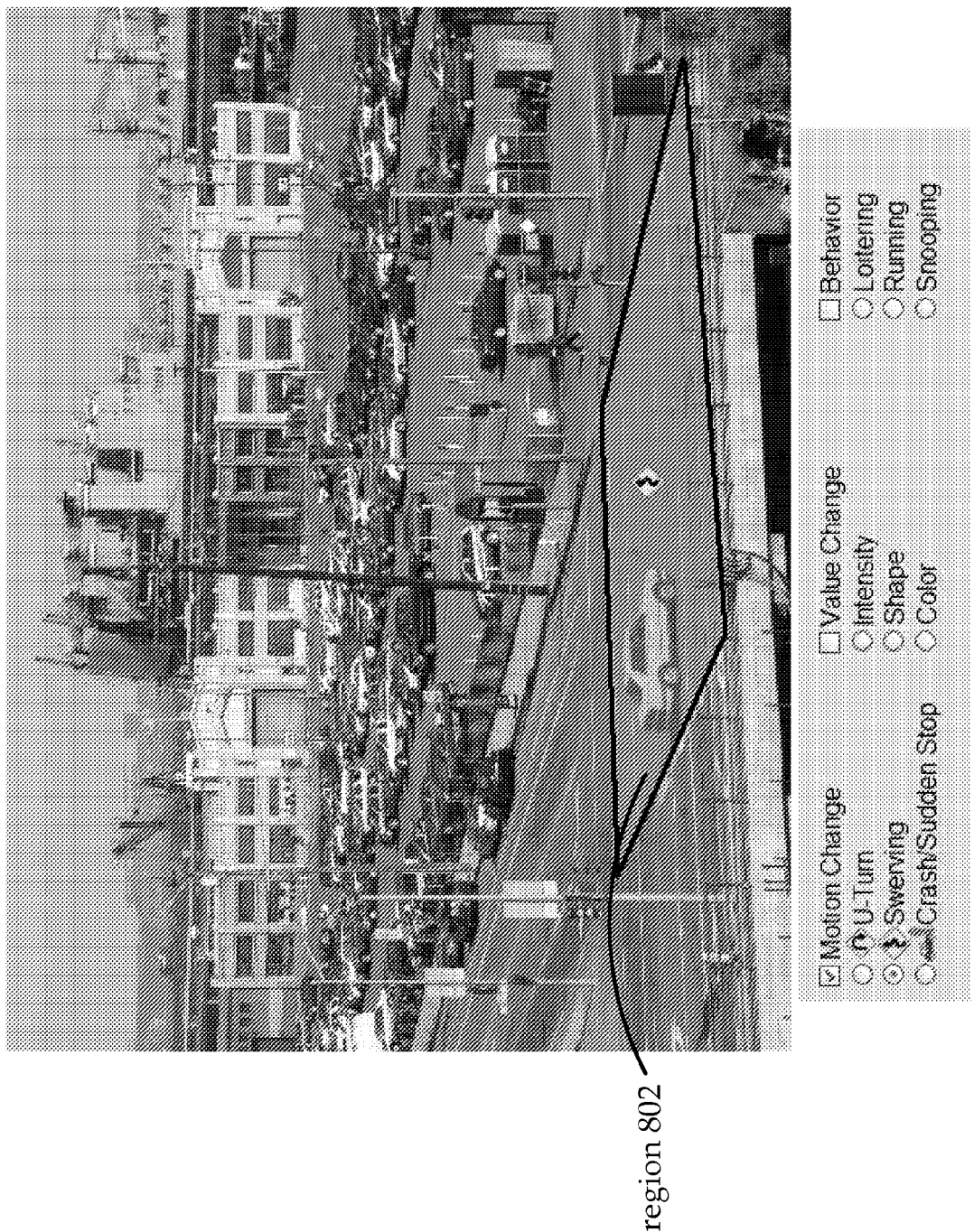
FIG. 8 is a screenshot illustrating that a type of motion change for a vehicle may be specified for a particular region, according to an embodiment of the invention.

FIG. 8 is a screenshot illustrating that a type of motion change for a vehicle may be specified for a particular region 802, according to an embodiment of the invention. As described above and illustrated in FIG. 8, one of the checkboxes may include "Motion Change" for a vehicle. In this example, the type motion change selected for region 802 is "Swerving." Other types of motion change may include, but are not limited to, U-turns and sudden stops (such as crashes).

Searching

With the above illustrated examples of the types of visual changes that may be specified, the number of possible event generation criteria, alert criteria, and search criteria is innumerable. For example, a single set of search criteria may include (1) multiple ranges of time, (2) the speed of motion in some regions, (3) the direction of motion in other regions, (4) an amount of pixel change in still other regions, (5) the shape and type of behavior of multiple detected objects, etc.

Multi-Level Searching—Regions

As described above, change information that is generated from video data may be aggregated at different levels of spatial granularity. For example, the change information stored for a particular time period may include (1) view-level VDCRs that indicate change information relative to the entire view, (2) quadrant-level VDCRs that indicate change information for each of four quadrants of the view, and (3) square-level VDCRs that indicate change information for each of a thousand grid squares within the view. The search mechanism may make use of these different levels of granularity to improve search performance.

For example, suppose a view is divided into one hundred non-overlapping squares. Further, suppose that a user is searching for motion events that occurred over a particular week, and that a million square-level VDCRs have been generated for each square during that week. Suppose that the search criteria includes that a specified type of motion occurred within each square of twenty-four specified squares of the view. In this example, if the entire search is performed at the square-level of granularity, then twenty-four million square-level VDCRs will have to be inspected during the search.

Instead of performing the entire search at the square-level of granularity, a multi-level search may be performed. Specifically, during the first phase of the multi-level search, each of a million view-level VDCRs may be inspected to find those view-level VDCRs that indicate that the specified motion occurred anywhere within the view. The determination may be based on view-level change information in each view-level VDCR. The view-level change information of a view-level VDCR indicates whether motion was detected anywhere in the entire view during the frames associated with the view-level VDCR. In the present example, the first-level search will involve one million comparisons (one for each view-level VDCR). For the purpose of explanation, assume that 50,000 view-level VDCRs matched the first-level search.

During the second-phase of the multi-level search, quadrant-level VDCRs are inspected. However, rather than inspecting all 4 million of the quadrant-level VDCRs, only the quadrant-level VDCRs that correspond to the 50,000 view-level VDCRs are searched in the second-level search. Further, if the 24 squares specified in the search criteria only fall within two of the four quadrants, then the second-level search need only involve the quadrant-level VDCRs associated with those two quadrants. Thus, the second phase of the search will involve no more than 100,000 quadrant-level VDCRs.

Each quadrant-level VDCR includes quadrant-level data that indicates whether motion was detected in any portion of the corresponding quadrant. For the purpose of explanation, assume that, based on the quadrant-level VDCRs, only 10,000 view-level VDCRs of the 50,000 VDCRs included motion in those two quadrants.

In the third level search, a square-level search is performed against the square-level VDCRs that correspond to the 10,000 view-level VDCRs. When searching at the square-level of granularity, 24 square-level VDCRs may need to be inspected for each of the 10,000 view-level VDCRs. However, because the candidate set of view-level VDCRs has been pruned down during the first two search phases, the number of square-level comparisons performed during the third-level search (240,000, in the present example) will typically be far fewer than the number of comparisons (24 million) that would have been performed if all searching was done at the square-level of granularity.

Multi-Level Searching—Time

As with areas of a view, a search may be separated into a multi-level search according to time. For example, suppose a user wants to find motion events that occurred between the hours of 1:00 AM and 5:00 AM during the past week. Further suppose that an hour-level VDCR exists for each hour and each day. Thus, in the first search level, each day-level VDCR of the past week is examined to determine whether motion was detected in the corresponding day. In the second search level, each hour-level VDCR that is associated with a day-level VDCR that was identified in the first search level is examined to determine whether motion was detected in the corresponding hour.

In one embodiment, one level of a multi-level search may be performed based on time and another level of the multi-level search may be performed based on areas of the view. For example, suppose search criteria specifies motion that occurred within a certain area of a view between the hours of 1:00 AM and 5:00 AM during the past week. Thus, the first two levels of the search may be used to identify all hour-level/view-level VDCRs of the past week between 1:00 AM and 5:00 AM. Subsequent levels of the search may be used to identify all hour-level/square-level VDCRs with change information that indicates the specified motion in the specified area.

In one embodiment, users may specify the search criteria for each level of a multi-level search. In another embodiment, multi-level searches may be performed automatically transparent to the user, beginning at relatively coarser temporal/spatial granularities and ending at the level of granularities of the search criteria that was specified by the user. Thus, a single set of search criteria may be automatically divided (e.g., by a query compiler) into one or more general searches and one specific search. Any mechanism for dividing search criteria into a multi-level query may be used. Embodiments of the invention are not limited to any specific mechanism.

Hardware Overview

Figure 9:
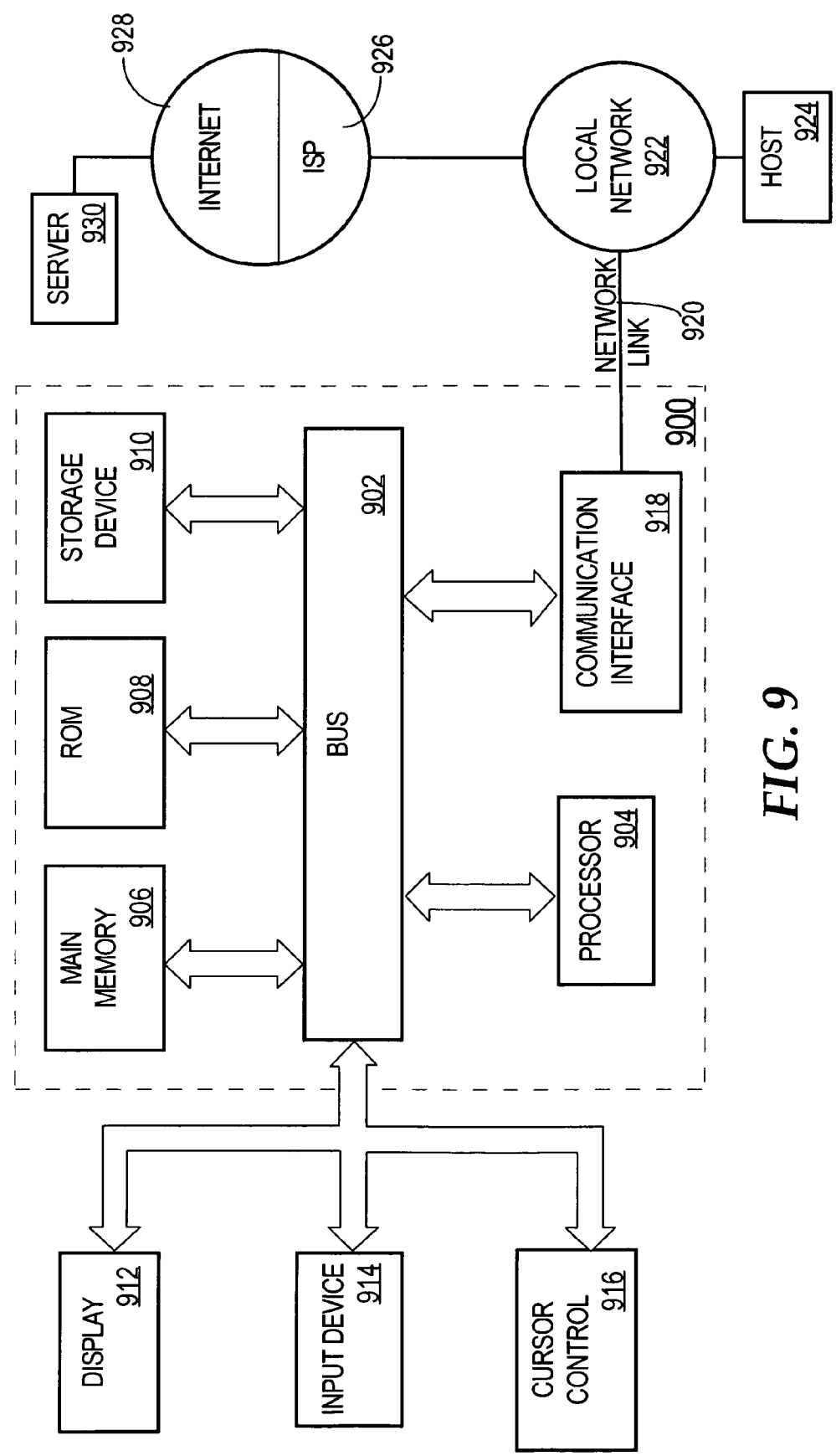
FIG. 9 is a block diagram of a computer system on which embodiments of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
storing change information about visual changes that occur in a two-dimensional view of visual information;
causing a user interface to be displayed that allows a user to specify search criteria;
wherein one search criteria option that the user interface allows the user to specify is a scope-of-change indication;
wherein the user interface presents controls for selecting between (1) a first scope-of-change option that indicates that a visual change must occur anywhere within a specified region of interest and (2) a second scope-of-change option that indicates that a visual change must occur across the entire specified region of interest;
receiving, from the user through the user interface, first search criteria that specifies:
a first region of interest within the view,
a particular visual change, and
a scope-of-change indication that indicates one of the first scope-of-change option or the second scope-of-change option for said particular visual change; and
comparing the first search criteria against said change information to identify a sequence of frames, within the visual information, (a) in which said particular visual change occurred within said first region of interest and (b) that satisfy the scope-of-change indication;
wherein the method is performed by one or more computing devices.

2. The method of claim 1, wherein the particular visual change is a detection of motion.

3. The method of claim 1, wherein said particular visual change indicates a change in pixel values.

4. The method of claim 2, wherein said particular visual change further indicates a direction of said motion.

5. The method of claim 4, wherein said scope-of-change indication indicates that the particular visual change must occur anywhere within the first region of interest.

6. The method of claim 2, wherein said particular visual change indicates a speed of said motion.

7. The method of claim 6, wherein said scope-of-change indication indicates that the particular visual change must occur across the entire first region of interest.

8. The method of claim 2, wherein said particular visual change indicates a shape of said motion.

9. A machine-implemented method comprising:
storing change information about visual changes that occur in a two-dimensional view of visual information;
receiving, from a user, first search criteria that specifies:
a first region of interest within the view,
a second region of interest within the view, wherein said second region of interest occupies a portion of the view that is not occupied by said first region of interest,
one or more visual changes,
a first scope-of-change indication for a first visual change of the one or more visual changes, and
a second scope-of-change indication for a second visual change of the one or more visual changes;
the first scope-of-change indication indicates that the first visual change must occur across the entire first region of interest and the second scope-of-change indication indicates that the second visual change must occur anywhere within the second region of interest; and
comparing the first search criteria against said change information to identify a sequence of frames, within the visual information, in which one of said one or more visual changes occurred within said first region of interest and in which one of said one or more visual changes occurred within said second region of interest;
wherein the method is performed by one or more computing devices.

10. The method of claim 1, wherein:
said visual information comprises a plurality of frames;
comparing the first search criteria against said change information to identify the sequence of frames is performed on change data corresponding to frames that are appended to the plurality of frames after the first search criteria is received.

11. The method of claim 1, wherein:
said visual information comprises a plurality of frames;
comparing the first search criteria against said change information to identify the sequence of frames is performed on change data corresponding to frames that were added to the plurality of frames before the first search criteria is received.

12. The method of claim 9, wherein at least one of the one or more visual changes indicates:
a detection of motion, and
one or more characteristics of said motion.

13. The method of claim 9, where said second region of interest and said first region of interest have at least one portion of the view in common.

14. The method of claim 9, wherein:
at least one of the one or more visual changes indicates a detection of motion of one or more objects and a direction of said motion.

15. The method of claim 9, wherein:
at least one of the one or more visual changes indicates a detection of motion of one or more objects and a speed of said motion.

16. The method of claim 1, wherein:
comparing said first search criteria includes:
identifying a first set of video data change records based on a second region within the view, wherein:
a video data change record corresponds to a plurality of frames of the visual information and includes change data that indicates visual changes that were detected relative to the corresponding plurality of frames, and the second region includes said first region of interest and is larger than said first region of interest; and based on the first set of video data change records and said first region, identifying a second set of video data change records, wherein the change data of each video data change record in the second set satisfies the first search criteria.

17. The method of claim 1, wherein:
comparing said first search criteria includes:
identifying a first set of video data change records based on a first time interval, wherein a video data change record:
corresponds to a plurality of frames of the visual information, and
includes change data that indicates visual changes that were detected relative to the corresponding plurality of frames; and
based on said first set of video data change records, identifying a second set of video data change records, wherein the change information of each video data change record in the second set satisfies the first search criteria.

18. The method of claim 9, further comprising:
causing, to be displayed to the user, a user interface that allows the user to select a Boolean OR or a Boolean AND that dictates whether one or more visual changes must occur in each of the first region of interest and the second region of interest in order to satisfy the first search criteria.

19. One or more non-transitory computer-readable media storing instructions which, when executed by one or more processors, cause:
storing change information about visual changes that occur in a two-dimensional view of visual information;
causing a user interface to be displayed that allows a user to specify search criteria;
wherein one search criteria option that the user interface allows the user to specify is a scope-of-change indication;
wherein the user interface presents controls for selecting between (1) a first scope-of-change option that indicates that a visual change must occur anywhere within a specified region of interest and (2) a second scope-of-change option that indicates that a visual change must occur across the entire specified region of interest;
receiving, from the user through the user interface, first search criteria that specifies:
a first region of interest within the view,
a particular visual change, and
a scope-of-change indication that indicates one of the first scope-of-change option or the second scope-of-change option for said particular visual change; and
comparing the first search criteria against said change information to identify a sequence of frames, within the visual information, (a) in which said particular visual change occurred within said first region of interest and (b) that satisfy the scope-of-change indication.

20. The one or more non-transitory computer-readable media of claim 19, wherein said particular visual change indicates a change in pixel values.

21. The one or more non-transitory computer-readable media of claim 19, wherein the particular visual change is a detection of motion.

22. The one or more non-transitory computer-readable media of claim 21, wherein said particular visual change further indicates a direction of said motion.

23. The one or more non-transitory computer-readable media of claim 22, wherein said scope-of-change indication indicates that the particular visual change must occur anywhere within the first region of interest.

24. The one or more non-transitory computer-readable media of claim 21, wherein said particular visual change indicates a speed of said motion.

25. The one or more non-transitory computer-readable media of claim 24, wherein said scope-of-change indication indicates that the particular visual change must occur across the entire first region of interest.

26. The one or more non-transitory computer-readable media of claim 21, wherein said particular visual change indicates a shape of said motion.

27. The one or more non-transitory computer-readable media of claim 19, wherein:
said visual information comprises a plurality of frames;
comparing the first search criteria against said change information to identify the sequence of frames is performed on change data corresponding to frames that are appended to the plurality of frames after the first search criteria is received.

28. The one or more non-transitory computer-readable media of claim 19, wherein:
said visual information comprises a plurality of frames;
comparing the first search criteria against said change information to identify the sequence of frames is performed on change data corresponding to frames that were added to the plurality of frames before the first search criteria is received.

29. The one or more non-transitory computer-readable media of claim 19, wherein:
comparing said first search criteria includes:
identifying a first set of video data change records based on a second region within the view, wherein:
a video data change record corresponds to a plurality of frames of the visual information and includes change data that indicates visual changes that were detected relative to the corresponding plurality of frames, and
the second region includes said first region of interest and is larger than said first region of interest; and
based on the first set of video data change records and said first region, identifying a second set of video data change records, wherein the change data of each video data change record in the second set satisfies the first search criteria.

30. The one or more non-transitory computer-readable media of claim 19, wherein:
comparing said first search criteria includes:
identifying a first set of video data change records based on a first time interval, wherein a video data change record:
corresponds to a plurality of frames of the visual information, and
includes change data that indicates visual changes that were detected relative to the corresponding plurality of frames; and
based on said first set of video data change records, identifying a second set of video data change records, wherein the change information of each video data change record in the second set satisfies the first search criteria.

31. One or more non-transitory computer-readable media storing instructions which, when executed by one or more processors, cause:

storing change information about visual changes that occur in a two-dimensional view of visual information;

receiving, from a user, first search criteria that specifies:
- a first region of interest within the view,
- a second region of interest within the view, wherein said second region of interest occupies a portion of the view that is not occupied by said first region of interest,
- one or more visual changes,
- a first scope-of-change indication for a first visual change of the one or more visual changes, and
- a second scope-of-change indication for a second visual change of the one or more visual changes;
- the first scope-of-change indication indicates that the first visual change must occur across the entire first region of interest and the second scope-of-change indication indicates that the second visual change must occur anywhere within the second region of interest; and comparing the first search criteria against said change information to identify a sequence of frames, within the visual information, in which one of said one or more visual changes occurred within said first region of interest and in which one of said one or more visual changes occurred within said second region of interest.

32. The one or more non-transitory computer-readable media of claim 31, where said second region of interest and said first region of interest have at least one portion of the view in common.

33. The one or more non-transitory computer-readable media of claim 31, wherein:

at least one of the one or more visual changes indicates a detection of motion of one or more objects and a direction of said motion.

34. The one or more non-transitory computer-readable media of claim 31, wherein:

at least one of the one or more visual changes indicates a detection of motion of one or more objects and a speed of said motion.

35. The one or more non-transitory computer-readable media of claim 31, wherein at least one of the one or more visual changes indicates:

a detection of motion, and one or more characteristics of said motion.

36. The one or more non-transitory computer-readable media of claim 31, wherein the instructions, when executed by the one or more processors, further cause:

causing, to be displayed to the user, a user interface that allows the user to select a Boolean OR or a Boolean AND that dictates whether one or more visual changes must occur in each of the first region of interest and the second region of interest in order to satisfy the first search criteria.

\* \* \* \* \*